United States Patent [19]

Vinson et al.

[11] Patent Number: 4,653,278
[45] Date of Patent: Mar. 31, 1987

[54] GAS TURBINE ENGINE CARBURETOR

[75] Inventors: John W. Vinson, Salem; Pamela C. Kwong, Burlington, both of Mass.; Paul E. Sabla, Cincinnati, Ohio

[73] Assignee: General Electric Company, Lynn, Mass.

[21] Appl. No.: 768,600

[22] Filed: Aug. 23, 1985

[51] Int. Cl.⁴ .............................. F02C 1/00; F02C 3/26
[52] U.S. Cl. ............................................ 60/737; 60/748
[58] Field of Search ...................... 60/39.465, 740, 742, 60/746, 748, 749, 737; 431/158, 187, 354; 239/433, 556, 432, 434.5

[56] References Cited

U.S. PATENT DOCUMENTS

| | | | |
|---|---|---|---|
| 2,618,928 | 11/1952 | Nathan | 60/742 |
| 2,625,788 | 1/1953 | Neikirk et al. | 60/746 |
| 2,850,875 | 9/1958 | Gahwyler | 60/748 |
| 2,974,488 | 3/1961 | Eggers et al. | 60/746 |
| 3,452,933 | 7/1969 | Hakluytt | 431/354 |
| 3,735,930 | 5/1973 | Mori . | |
| 3,739,576 | 6/1973 | Chamberlain | 60/748 |
| 3,773,075 | 11/1973 | Thompson et al. | 431/354 |
| 3,851,462 | 12/1974 | Vranos | 60/742 |
| 3,853,273 | 12/1974 | Bahr et al. . | |
| 4,070,826 | 1/1978 | Stenger et al. | 60/748 |
| 4,073,134 | 2/1978 | Koch | 60/748 |
| 4,152,108 | 5/1979 | Reed et al. | 431/354 |
| 4,180,974 | 1/1980 | Stenger et al. . | |
| 4,198,815 | 4/1980 | Bobo et al. | 60/748 |
| 4,229,944 | 10/1980 | Weiler | 60/740 |
| 4,362,021 | 12/1982 | Willis | 60/748 |
| 4,584,834 | 4/1986 | Koshofter et al. | 60/737 |

FOREIGN PATENT DOCUMENTS 650608 2/1951 United Kingdom ................ 60/749

Primary Examiner—Louis J. Casaregola
Assistant Examiner—Timothy S. Thorpe
Attorney, Agent, or Firm—Francis L. Conte; Derek P. Lawrence

[57] ABSTRACT

A gas turbine engine carburetor including an annular swirler and a new and improved fuel injector cooperating therewith is disclosed which is effective for providing low BTU gaseous fuel to a combustor. The swirler includes a plurality of circumferentially spaced swirler vanes effective for channeling air along an annular inner surface of the swirler. The fuel injector includes a hollow injector tip having an aft portion including a plurality of circumferentially spaced outlet apertures disposed in an outer surface thereof. The outer surface is aligned obliquely to a longitudinal centerline axis of the injector tip and the swirler.

25 Claims, 6 Drawing Figures

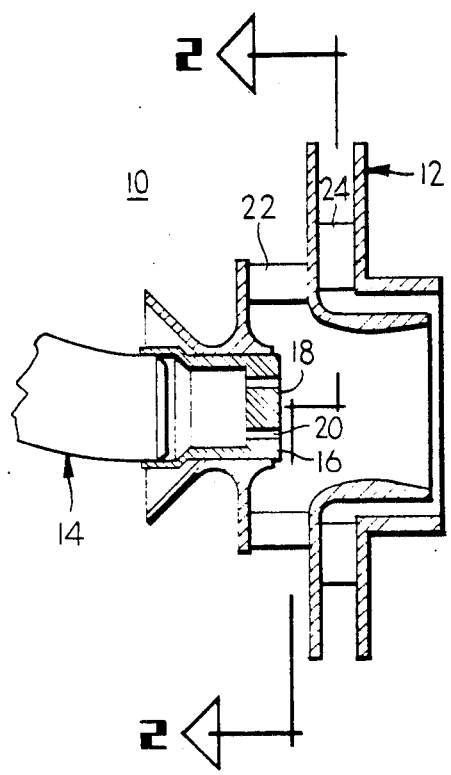
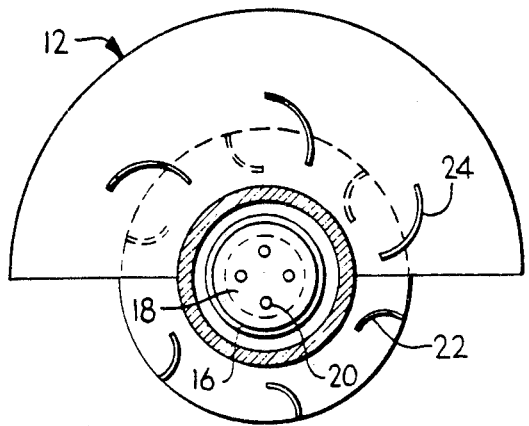
PRIOR ART
Fig 1
PRIOR ART
Fig 2
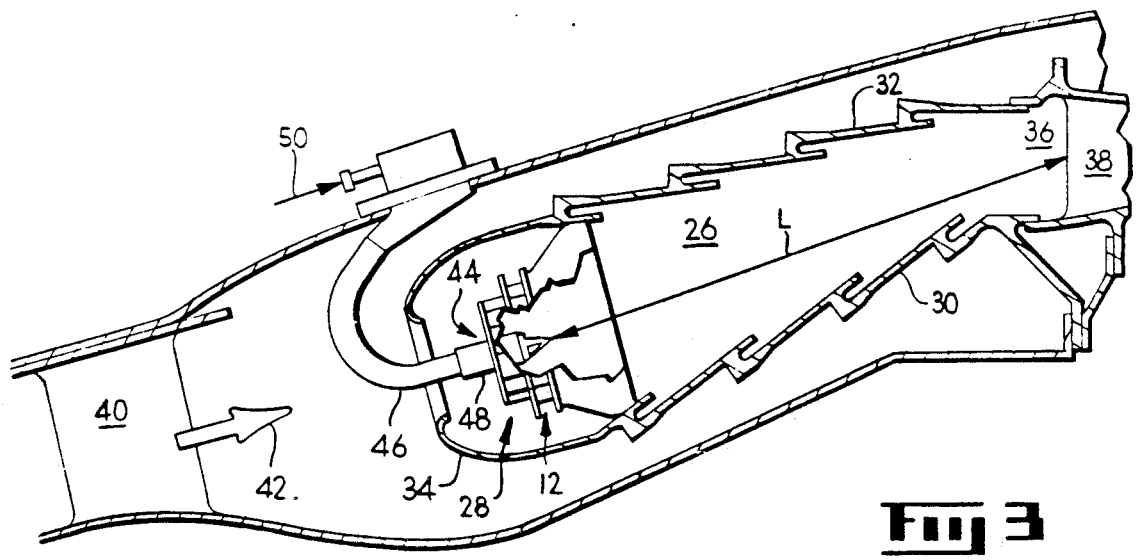
Fig 3

GAS TURBINE ENGINE CARBURETOR

BACKGROUND OF THE INVENTION

This invention relates generally to gas turbine engine carburetors and more specifically to such carburetors effective for utilizing relatively low BTU gaseous fuels.

Recent advances in coal and biomass gasifier technology have generated a growing interest in airblown gasifier gas turbine engine systems for use in both stationary and mobile power generation applications. Depending on the nature of the coal or biomass material supplied to the gasifier and on the gasifier type, gas fuels having relatively low heating values of about 3.72 to about 5.58 megajoules per standard cubic meter ($MJ/m^3$), or, equivalently, about 100 to 150 BTU per standard cubic foot (BTU/SCF) is produced (hereinafter referred to as "low BTU" gaseous fuel or, simply, fuel).

Marine and Industrial (M&I) gas turbine engines are typically derived from aircraft gas turbine engines which conventionally utilize carburetors effective for mixing air with an atomized liquid fuel having relatively high BTU values. Two examples of conventional gas turbine engine carburetors which atomize a liquid fuel for mixing with air are disclosed in U.S. Pat. No. 4,180,974—R. E. Stenger et al and U.S. Pat. No. 3,853,273—D. W. Bahr et al, both assigned to the present assignee and incorporated herein by reference.

An M&I engine is typically substantially identical to the aircraft engine from which it is derived. However, some M&I engines are structurally modified to operate on alternative fuels such as, for example, natural gas. Natural gas has a heating value of about 850 to about 900 BTU/SCF which is less than that of liquid fuels which have a relatively higher BTU content. To utilize natural gas, a conventional atomizing type fuel injector in the carburetor is not needed or usable, and a relatively simple gas injector is typically substituted therefor.

A known gas fuel injector includes a gas delivery tube and a simple, hollow injector tip having a plurality of apertures facing directly in a downstream direction along the centerline of a typical combustor. For a relatively large M&I engine, the tip outlet apertures may be predeterminedly sized for providing a sufficient volume flow rate of natural gas for combustion. Of course, inasmuch as the basic M&I engine is substantially identical to its corresponding aircraft engine, the volume flow rate of natural gas must be, accordingly, proportionately higher than the flow rate of the liquid fuel required for the designed-for power requirements of the engine to account for the relatively lower BTU content of natural gas as compared to the liquid fuel.

However, it has been discovered that for relatively small combustors found in small aircraft derivative M&I engines, the use of a conventional natural gas injector is unacceptable. For example, in view of the relatively high fuel volumetric flow rate required to meet the design requirements of the engine, the space restrictions of the conventional swirler assembly used in the carburetor of the combustor place a limit on the maximum flow area size of the fuel injector tip outlet apertures and results in relatively high discharge velocity of gases therethrough. This discharge velocity would be so high that the gas could not properly mix with air from the swirler, but instead would be directed as a jet through the combustor without properly being mixed and burned therein.

SUMMARY OF THE INVENTION

Accordingly, an object of the present invention is to provide a new and improved carburetor for a gas turbine engine.

Another object of the present invention is to provide a new and improved carburetor effective for use in a relatively small gas turbine engine utilizing a gaseous fuel.

Another object of the present invention is to provide a carburetor having a new and improved fuel injector cooperating with a swirler and effective for providing relatively low BTU fuel to the combustor.

Another object of the present invention is to provide a carburetor having a new and improved fuel injector cooperating with a swirler for providing a mixture of a combustible gas and air is a relatively short combustor.

The invention comprises a gas turbine engine carburetor including an annular swirler and a new and improved fuel injector cooperating therewith. The swirler includes a plurality of circumferentially spaced swirler vanes effective for channeling air along an annular inner surface of the swirler. The fuel injector includes a hollow injector tip having an aft portion including a plurality of circumferentially spaced outlet apertures disposed in an outer surface thereof. The outer surface is aligned obliquely to a longitudinal centerline axis of the injector tip.

BRIEF DESCRIPTION OF THE DRAWING

The novel features believed characteristic of the invention are set forth in the claims.

The invention in accordance with a preferred embodiment together with further objects and advantages thereof is more particularly described in the following detailed description taken in conjunction with the accompanying drawing in which:

FIG. 1 is a partly sectional side view of a prior art gas fuel injector.

FIG. 2 is a partly sectional end view of the injector tip of the prior art injector shown in FIG. 2 taken along line 2—2.

FIG. 3 is a partly sectional side view of a combustor region of a gas turbine engine including a carburetor in accordance with one embodiment of the present invention.

DETAILED DESCRIPTION

Figure 4:
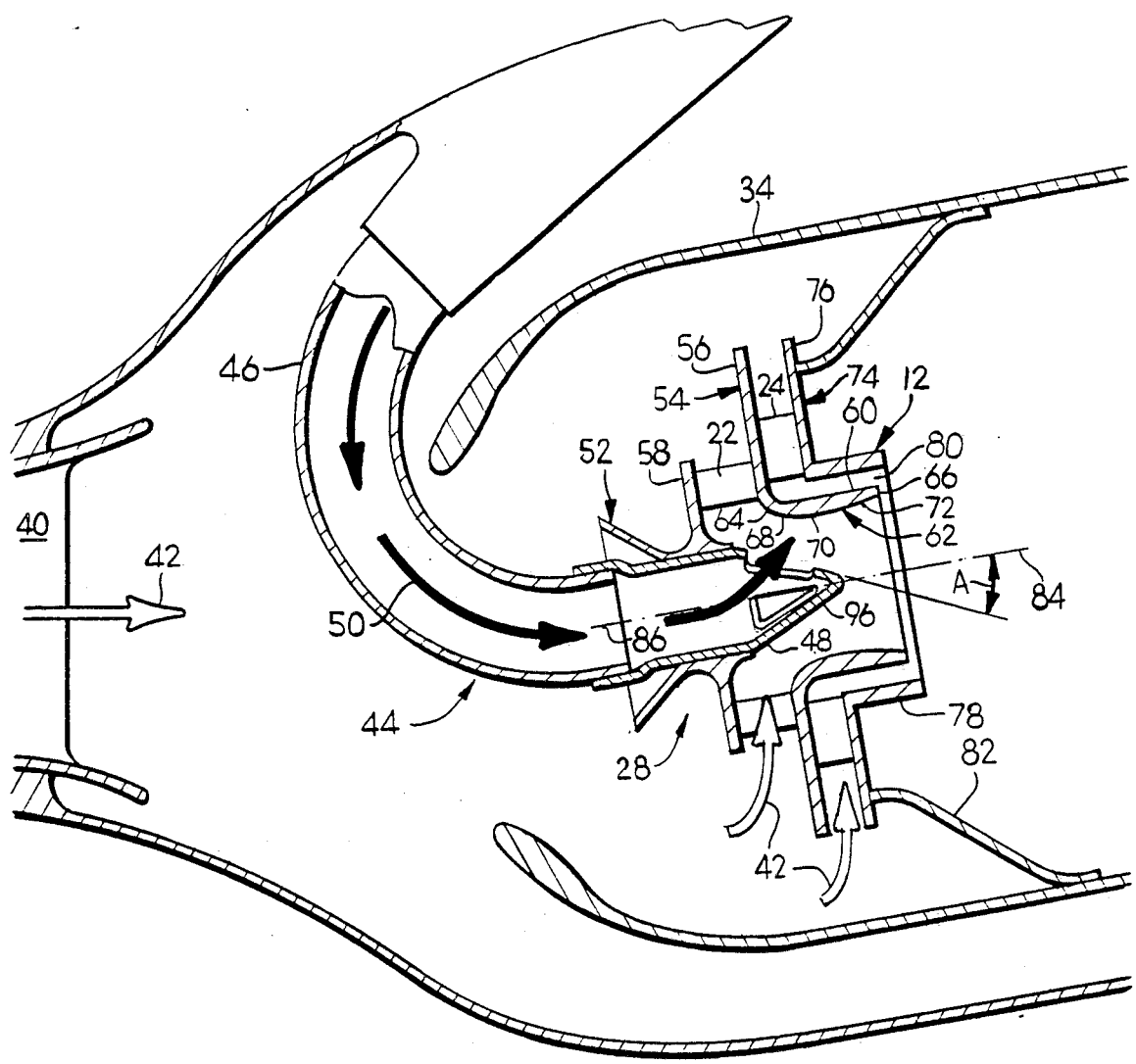
FIG. 4 is a partly sectional enlarged view of the dome end of the combustor and carburetor illustrated in FIG. 3.

Illustrated in FIGS. 1 and 2 is a prior art carburetor 10 effective for providing a mixture of air and a gaseous fuel such as natural gas to a combustor of an M&I engine. The carburetor 10 includes a conventional counter rotating annular swirler 12 and a fuel injector 14 effective for channeling fuel to the swirler 12. The injector 14 includes a cylindrical tip 16 suitably disposed in an upstream end of the swirler 12. The tip 16 includes a circular aft end surface 18 including a plurality of discharge apertures 20 therein disposed perpendicularly thereto. The swirler 12 includes a first row 22 and a second row 24 of circumferentially spaced swirler vanes effective for channeling and swirling air in opposite directions.

In operation, fuel is discharged through the apertures 20 in a downstream direction and is mixed with air from the first and second swirlers 22 and 24 before entering the combustor (not shown). For a relatively large combustor, for example, having a length of about 16 inches from the injector 14 to the discharge end of the combustor, the carburetor 10 is effective for providing a gaseous fuel at sufficient volumetric flow rates for operating the engine at its design condition initially determined utilizing a liquid fuel. It has been found that acceptable combustion occurs inasmuch as the apertures 20 may be made sufficiently large to provide a sufficiently high volumetric flow rate of gas without an excessive velocity thereof in the combustor.

However, for a relatively small gas turbine engine and combustor, it has been found that the prior art carburetor 10 illustrated in FIGS. 1 and 2 cannot be simply scaled down to provide the volumetric flow rate of low BTU gas required for obtaining the equivalent heat content of a liquid fuel. This is due, for example, because the conventional swirler 12 provides a structural limitation on the size of the injector tip 16 which limits the discharge flow area of the apertures 20.

Accordingly, in order to obtain the volumetric flow rate of gas through the apertures 20 an excessively high velocity of gas must be provided therethrough. In a small combustor, the gas would, therefore, create a jet through the combustor which would not effectively mix with air and properly burn therein.

Illustrated in FIG. 3 is a partly sectional view of a conventional combustor 26 having a carburetor 28 in accordance with one embodiment of the present invention. The combustor 26 includes an annular inner liner 30 spaced from an annular outer liner 32 and an annular dome 34 joining upstream ends thereof and which defines a combustor inlet end. The combustor 26 also includes an outlet end 36 through which combustion gases are discharged to a conventional turbine nozzle 38. A conventional diffuser 40 is disposed upstream of the combustor 26 and is effective for channeling compressed air 42 from a conventional compressor (not shown).

The carburetor 28 includes the conventional swirler 12 and a gaseous fuel injector 44 in accordance with an exemplary embodiment of the present invention.

The injector 44 includes a suitable delivery tube 46 and a hollow injector tip 48 in suitable flow communication therewith.

A gaseous fuel 50 is suitably conventionally provided to the injector 44. The fuel 50 is discharged from the tip 48 into the swirler 12 where it is mixed with air 42 and channeled into the combustor 26. The combustor 26 is relatively short having a burning length L from the tip 48 to its outlet end 36 of about 6.7 inches. The carburetor 28 in accordance with the present invention is effective for providing the relatively low BTU gaseous fuel 50 to the combustor 26 at sufficient volumetric flow rates for obtaining acceptable conventional performance of the combustor 26 equivalent to that which would be obtained using a conventional carburetor and a liquid fuel.

The carburetor 28, in accordance with an exemplary embodiment of the present invention, is more particularly illustrated in the enlarged view illustrated in FIG. 4. More specifically, the swirler 12 includes a first tubular flange 52 in which the injector tip 48 is loosely supported. A second tubular flange 54 is spaced downstream from the first flange 52 and includes a first, vertical portion 56 which along with a vertical portion 58 of the first flange 52 fixedly supports the first swirler vanes 22 therebetween.

The second flange 54 further includes an annular horizontal portion 60 having an annular inner surface 62. More specifically, the horizontal portion 60 has an upstream end 64, fixedly connected to the vertical portion 56, and a downstream end 66. In the exemplary embodiment illustrated, the inner surface 62 defines a venturi having a converging portion 68 extending to a throat portion 70 having a minimum diameter, and a diverging portion 72 extending from the throat 62 to the downstream end 66.

The swirler 12 further includes an annular support flange 74 having a vertical portion 76 spaced from the second flange vertical portion 56 which together therewith fixedly supports the second swirler vanes 24 therebetween. Fixedly connected to an inner end of the vertical portion 76 is a horizontal portion 78 which is spaced from the second flange horizontal portion 60 to define an annular channel 80 therebetween. The swirler 12 is suitably fixedly attached to the dome 34 by a support ring 82 fixedly connecting the dome 34 and the support flange 74.

The swirler 12 is conventional and is effective for channeling air 42 radially inwardly with respect to a swirler first longitudinal centerline axis 84 and then in a substantially axial direction parallel to the first axis 84 through both the venturi 62 and the channel 80 for obtaining contra-rotation of the air 42.

Figure 6:
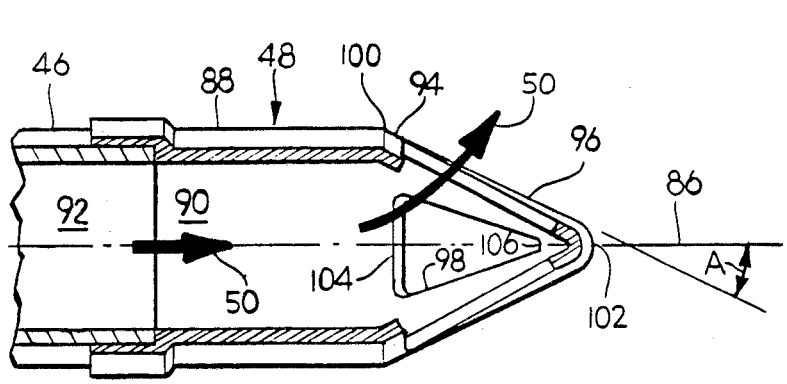
FIG. 6 is a sectional side view of the injector tip illustrated in FIGS. 4 and 5.
Figure 5:
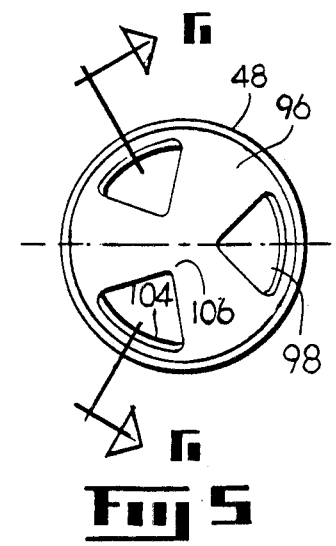
FIG. 5 is an end view of the fuel injector illustrated in FIG. 4.

The hollow injector tip 48 in accordance with an exemplary embodiment of the invention is illustrated generally in FIG. 4 and more particularly in FIGS. 5 and 6. The tip 48 includes a second, longitudinal centerline axis 86 which, as illustrated, is aligned co-linearly with the first axis 84 of the swirler 12 as illustrated in FIG. 4. The tip 48 includes a first forward portion 88 having an inlet 90 in flow communication with an outlet 92 of the delivery tube 46. The tip 48 further includes an integral hollow aft portion 94 extending in flow communication from the first portion 88. The aft portion 94 includes an outer surface 96 including a plurality of discharge outlets 98 disposed perpendicularly thereto.

In the exemplary embodiment of the invention as illustrated in FIGS. 4–6, the outer surface 96 is conical and decreases in circumference in a downstream direction from a base end 100 to a tip end 102 of the aft portion 94. The outer surface 96 is obliquely aligned at an angle A with respect to the second axis 86, with the angle A being greater than about 0 degrees and less than about 90 degrees.

Three relatively large and equally circumferentially spaced discharge outlets 98 are illustrated and are preferably triangular in shape for maximizing the amount of discharge area through the tip aft portion 94. More specifically, each outlet 98 has an isoceles triangular shape with a base 104 disposed at the base end 100 of the aft portion 94, and a tip 106 disposed outwardly therefrom in a downstream direction at the tip end 102 of the aft portion 94.

The injector tip 48 in accordance with the invention as above described is effective for providing an increased amount of gas discharge flow area per unit frontal area. More specifically, utilizing identical swirlers such as those illustrated in FIGS. 1 and 4, it will be appreciated that the prior art injector tip apertures 20 are limited in area to that provided by the circular end surface 18. However, in accordance with the present invention, the obliquely angled outer surface 96 of FIGS. 4 and 5 provides for an increased surface area over that illustrated in FIG. 1. For a given diameter of the prior art injector tip 16 and the injector tip forward portion 88 mounted in the swirler 12, the obliquely angled outer surface 96 has an increased surface area because it also extends in a downstream direction. Accordingly, more surface area exists for providing outlet apertures therein, thusly increasing the maximum amount of area available for the discharge outlets 98. This is a significant feature of the present invention because by increasing the area of discharge outlets 98, the velocity of fuel 50 being discharged therethrough can be proportionately decreased.

Accordingly, in order that the carburetor 28 be effective for providing a sufficiently high volumetric flow rate of a relatively low BTU gaseous fuel for equaling the heat content of a liquid fuel carburetor being replaced, means must be provided to provide such relatively high volumetric flow rate without unacceptably high velocities as above described.

Furthermore, the obliquely angled outer surface 96 provides an additional benefit by discharging the fuel 50 at an oblique angle with respective to the second centerline axis 86 and not parallel thereto. This helps reduce the problem of a jet of fuel 50 being directed straight through the combustor as above described.

In this regard, the fuel delivery tube outlet 92 has a discharge area B and the tip discharge outlets 98 collectively have an area C which may be at least as large as the area B. Such a relationship cannot practically be employed in the prior art injector 14 because it would provide an unacceptable jet of fuel which would not provide for acceptable combustor performance. Of course, the area C may be smaller or larger than the area B depending upon the particular design requirements involved. However, those skilled in the art will find from the teachings herein that an increased range in the magnitude of the area C is now available for use in any particular design.

Furthermore, the tip aft portion outer surface 96 has a total surface area D. In the exemplary embodiment, the discharge outlet area C is at least as large as D/4. Of course, the ratio of the area C to area D will be determined in accordance with particular design objectives and structural considerations.

It will be appreciated that these exemplary relationships of the discharge area of the tube outlet 92, tip discharge outlet 98, and tip outer surface 96 provide the capability for a relatively large fuel discharge area per unit frontal area of the tip 48 within the structural limitations of the tube 46 and the swirler 12.

An additional significant feature of the present invention is the obliquely angled outer surface 96. In the exemplary embodiment illustrated in FIG. 4, the outer surface 96 is oriented so that the angle A is preferably greater than about 0 degrees and less than about 45 degrees for increasing the component of velocity of the fuel 50 in the radial direction and decreasing the component of velocity in the axial direction. In particular, the angle A is 15 degrees.

Furthermore, the tip 48 is aligned along the first centerline axis 84 and positioned within the axial positions of the first swirler vane 22 and the venturi 62. In particular, the discharge outlets 98 face substantially toward the converging portion 68 of the inner surface 62.

This preferred orientation of the tip 48 with respect to the venturi 62 allows the fuel 50 being discharged from the discharge outlets 98 to impinge upon the converging portion 68 to partially reduce its velocity. The fuel 50 also mixes with the air 42 being channeled by the first swirler vane 22 which has an effect of reducing the velocity of the fuel 50 in a downstream direction by such mixing.

The mixed air 42 and the fuel 50 are then channeled through the venturi throat 70 and diverging portion 72 to mix with the air 42 being channeled through the second swirler vanes 24 and the channel 80.

The invention in accordance with the particular embodiment of the invention illustrated has been analyzed and tested in a combustor for a relatively small turboshaft engine in the four megawatt class and has been found to result in acceptable combustor performance when compared to an identical engine utilizing a conventional liquid fuel carburetor. In particular, a conical injector tip 48 having an outer surface disposed at an angle A equal to 15 degrees was utilized with a discharge area C being equal to about 1.3 B, and about 0.25 D. The combustor 26 had a length L of about 6.7 inches and and a burning length-to-dome height ratio of about 2.98.

Tests showed acceptable combustor performance for gases having heating valves as low as about 3.72 $MJ/m^3$ (100 BTU/SCF). For example, the temperature profile and pattern factors at the outlet end 36 of the combustor 26 were generally similar to and equally acceptable as those for a similar combustor having a natural gas fuel injector. Furthermore, these factors are also acceptable when compared to those factors obtained from a liquid fuel injector combustor.

It is to be noted that the test facilities utilized did not allow for fuel testing at lower than about 100 BTU/SCF. It is envisioned that the present invention may be utilized for fuels having less than 100 BTU/SCF, which may be confirmed by utilizing facilities capable of testing such lower BTU fuels.

Accordingly, the carburetor 28 including the new and improved fuel injector 44 is effective for allowing a liquid fuel gas turbine engine to burn a relatively low BTU gaseous fuel while obtaining acceptable combustor performance with relatively few engine modifications.

While there has been described herein what is considered to be a preferred embodiment of the present invention other modifications of the invention shall be apparent to those skilled in the art from the teachings herein, and it is desired to secure in the appended claims all such modifications as fall within the true spirit and scope of the invention. More specifically, and for example only, although a particular counterrotating swirler 12 has been disclosed, other conventional or counterrotating or single rotation swirlers may also be utilized. Although a fuel injector 44, including a straight sided conical tip 48 has been disclosed, other tips having outer surfaces which decrease in circumference in a downstream direction may be utilized. Furthermore, although three triangularly shaped tip discharge outlets 98 are preferred for maximizing discharge area, other discharge outlet shapes and quantities may be utilized and fall within the scope of the present invention.

Accordingly, what is desired to be secured by Letters Patent of the United States is the invention as recited in the following claims.

We claim:

1. A carburetor for a gas turbine engine for mixing air with a combustible, gaseous fuel supplied through an inlet, comprising:

an annular swirler having a first longitudinal centerline axis, an annular inner surface disposed coaxially with respect to said first axis, and a plurality of circumferentially spaced swirler vanes fixedly connected to an upstream end of said inner surface, said swirler vanes being positioned to channel air over said inner surface; and a fuel injector for injecting only said gaseous fuel, said fuel injector including a hollow injector tip formed as a single annular shell having a second longitudinal centerline axis, said injector tip comprising a substantially cylindrical forward portion including said inlet for receiving said gaseous fuel therethrough at an inlet velocity, and an aft portion having a decreasing cross sectional area in the downstream direction, said tip aft portion having an outer surface directly facing said swirler inner surface and being obliquely aligned at an angle A with respect to said second axis, said angle A being greater than 0 degrees and less than 90 degrees, and said tip aft portion including a plurality of circumferentially spaced outlet apertures disposed in said outer surface for discharging said gaseous fuel therethrough, said outlet apertures directly facing said swirler inner surface and being sized relative to said inlet to reduce the axial velocity of said discharged gaseous fuel below said inlet velocity, and said swirler vanes and said outlet apertures being positioned relative to each other to cause said air channeled over said swirler inner surface to mix substantially only with said discharged gaseous fuel.

2. A gas turbine engine carburetor according to claim 1 wherein said inlet has an area B, and wherein said injector tip outlet apertures collectively have a discharge area C greater than said area B.

3. A gas turbine engine carburetor according to claim 1 wherein said injector tip outlet apertures collectively have a discharge area C, and said injector tip aft portion outer surface has a surface area D, said area C being greater than about D/4.

4. A gas turbine engine carburetor according to claim 1 wherein said injector tip aft portion is conical.

5. A gas turbine engine carburetor according to claim 1 wherein said injector tip outlet apertures are triangularly shaped each having a base end and an apex end facing in the upstream and downstream directions respectively.

6. A gas turbine engine carburetor according to claim 1 wherein said injector tip aft portion is conical and wherein said injector tip outlet apertures are triangularly shaped each having a bae end positioned adjacent the base of said conical aft section and an apex end facing in a downstream direction therefrom, said angle A being greater than 0 degrees and less than 45 degrees.

7. A gas turbine engine carburetor according to claim 6 wherein said fuel injector further includes a gas delivery tube in flow communication with said injector tip inlet, said inlet having an area B, and wherein said injector tip outlet apertures collectively have a discharge area C greater than said area B.

8. A gas turbine engine carburetor according to claim 6 wherein said injector tip outlet apertures collectively have a discharge area C, and said injector tip aft portion outer surface has a surface area D, said area C being greater than about D/4.

9. A gas turbine engine carburetor according to claim 6 wherein said swirler inner surface defines a venturi having a converging portion including a throat, and said injector tip outlet apertures being oriented to direct said discharged gaseous fuel toward said venturi throat.

10. A gas turbine engine carburetor according to claim 1 wherein said swirler inner surface defines a venturi having a converging portion, and said injector tip outlet apertures being oriented to direct said discharged gaseous fuel toward said venturi converging portion.

11. A carburetor for a gas turbine engine for mixing air with a combustible, gaseous fuel supplied through an inlet comprising:

an annual swirler having a first longitudinal centerline axis, an annular inner surface disposed coaxially with respect to said first axis, and a plurality of circumferentially spaced swirler vanes fixedly connected to an upstream end of said inner surface for channeling air over said inner surface;

a fuel injector for injecting only said gaseous fuel, said fuel injector including a hollow injector tip having a second longitudinal centerline axis aligned coaxially with said first axis, said injector tip including said inlet for receiving said gaseous fuel therethrough at an axial inlet velocity and a conical aft portion having an outer surface directly facing said swirler inner surface, said outer surface decreasing in circumference in a downstream direction and being aligned at an angle A of about 15 degrees with respect to said second axis, said tip aft portion including a plurality of circumferentially spaced triangularly shaped outlet apertures for discharging said gaseous fuel therethrough, said apertures lying substantially in said outer surface and each having a base end positioned adjacent the base of said conical aft section and an apex end facing in a downstream direction therefrom, said outlet apertures being sized relative to said inlet to reduce the axial velocity of the discharged gaseous fuel below said inlet velocity, said apertures directly facing said swirler inner surface to effect further velocity reduction by impingement of said gaseous fuel on said inner surface and by mixing with said air from said swirler vanes.

12. A gas turbine engine carburetor according to claim 11 wherein said fuel injector further includes a gas delivery tube in flow communication with said injector tip inlet, said inlet having an area B, and wherein said injector tip outlet apertures collectively have a discharge area C greater than said area B.

13. A gas turbine engine carburetor according to claim 12 wherein said injector tip aft portion outer surface has a surface area D and said area C is greater than about D/4.

14. A gas turbine engine carburetor according to claim 14 wherein said swirler inner surface defines a venturi having a converging portion, said injector tip outlet apertures being oriented to direct said discharged gaseous fuel toward said venturi converging portion for mixing with air from said swirler vanes, and said swirler further including a plurality of circumferentially spaced second swirler vanes for swirling air in a direction opposite to the swirling direction of air from said first vanes, said second vanes being positioned so as to effect further mixing with air downstream from said converging portion.

15. A fuel injector for a gas turbine engine comprising:
    a gas delivery tube for receiving and channeling only a gaseous fuel;
    a hollow injector tip having a longitudinal centerline axis and an inlet of area B, said inlet being in flow communication with said delivery tube for receiving said gaseous fuel therefrom at an inlet velocity, said injector tip further including an aft end portion having an outer surface decreasing in circumference in a downstream direction, a plurality of circumferentially spaced outlet apertures disposed in said outer surface for discharging said gaseous fuel therethrough, said outlet apertures collectively having a discharge area C, and means for reducing the axial discharge velocity of said gaseous fuel below said inlet velocity wherein area C is greater than area B.

16. A fuel injector according to claim 15 wherein said tip aft end portion outer surface has an area D and said discharge area C is greater than about D/4.

17. A fuel injector according to claim 15 wherein said tip aft end portion is conical and said outer surface is aligned at an angle A with respect to said axis, said angle A being greater than 0 degrees and less than 90 degrees.

18. A fuel injector according to claim 17 wherein said angle A is greater than about 0 degrees and less than about 45 degrees.

19. A fuel injector according to claim 18 wherein said angle A is about 15 degrees.

20. A fuel injector according to claim 19 wherein said injector tip outlet apertures are triangularly shaped, each having a base end positioned adjacent the base of said conical aft end portion and an apex end extending in a downstream direction therefrom.

21. A gas turbine engine carburetor for mixing air with a combustible gaseous fuel comprising:
    an annular swirler having a first longitudinal centerline axis, an annular inner surface disposed coaxially with respect to said first axis, and a plurality of circumferentially spaced swirler vanes fixedly connected to an upstream end of said inner surface for channeling air over said inner surface;
    a fuel injector for injecting only said gaseous fuel and including a hollow injector tip having a second longitudinal centerline axis aligned with said first axis, said tip comprising an inlet for receiving said gaseous fuel at an inlet velocity and a tip aft portion including an outer surface, said outer surface having a plurality of mutually spaced outlet apertures disposed therein for discharging said gaseous fuel therethrough toward said swirler inner surface and to effect mixing with said air from said swirler vanes; and
    means for reducing the axial velocity of said gaseous fuel discharged from said outlet apertures below said inlet velocity, said axial velocity being a velocity component in an axial downstream direction parallel to said second longitudinal centerline axis.

22. A gas turbine engine carburetor according to claim 21 wherein said velocity reducing means comprises a collective discharge area of said tip outlet apertures greater than the flow area of said tip inlet.

23. A gas turbine engine carburetor acording to claim 22 wherein said velocity reducing means further comprises a selected orientation of said tip outlet apertures in directly facing relationship with respect to said swirler inner surface so as to cause said discharged gaseous fuel to impinge against said inner surface.

24. A gas turbine engine carburetor according to claim 23 wherein said tip aft end portion is conical and said tip outlet apertures each have a triangular configuration, each of said triangular apertures being circumferentially spaced from each other and having a base adjacent and parallel to the base of said conical aft end portion and an apex facing in a downstream direction.

25. A gas turbine engine carburetor according to claim 2 wherein said outlet apertures lie substantially in said outer surface of said tip aft portion oriented to directly face said swirler inner surface, said directly facing orientation being chosen to cause a further reduction in the velocity of the discharged gaseous fuel by impingement with said swirler inner surface and by mixing with said air.

* * * * *